US012192739B2

(12) United States Patent
Franco

(10) Patent No.: US 12,192,739 B2
(45) Date of Patent: Jan. 7, 2025

(54) INTERPOLATION OF FINITE IMPULSE RESPONSE FILTERS FOR GENERATING SOUND FIELDS

(71) Applicant: HARMAN INTERNATIONAL INDUSTRIES, INCORPORATED, Stamford, CT (US)

(72) Inventor: Alfredo Fernandez Franco, Sherman Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 169 days.

(21) Appl. No.: 17/964,543

(22) Filed: Oct. 12, 2022

(65) Prior Publication Data

US 2024/0129684 A1 Apr. 18, 2024

(51) Int. Cl.
*H04S 7/00* (2006.01)
*H04R 3/04* (2006.01)

(52) U.S. Cl.
CPC ............... *H04S 7/303* (2013.01); *H04R 3/04* (2013.01)

(58) Field of Classification Search
None
See application file for complete search history.

(56) References Cited

U.S. PATENT DOCUMENTS 11,658,631 B1 * 5/2023 Lim ......................... H03G 5/24 375/345
2024/0121568 A1 * 4/2024 Jin ......................... H04M 9/082

OTHER PUBLICATIONS

Mazur et al., "Robust Room Equalization Using Sparse Sound-Field Reconstruction", IEEE International Conference on Acoustics, Speech and Signal Processing, DOI: 10.1109/ICASSP.2019.8682228, May 12, 2019, pp. 4230-4234.
Katzberg et al., "Measurement of Sound Fields Using Moving Microphones", IEEE International Conference on Acoustics, Speech And Signal Processing, DOI: 10.1109/ICASSP.2017.7952753, Mar. 5, 2017, pp. 3231-3235.

* cited by examiner

*Primary Examiner* — Qin Zhu
(74) *Attorney, Agent, or Firm* — Artegis Law Group, LLP

(57) ABSTRACT

Various embodiments disclose a computer-implemented method comprising determining a target location in an environment, determining a set of sub-band impulse responses for a first frequency sub-band, each in the set of sub-band impulse responses being associated with a location proximate to the target location, selecting a first pair of sub-band impulse responses for the first frequency sub-band among pairs within the set of sub-band impulse responses, computing a first coherence value indicating a coherence level between sub-band impulse responses in the first pair, determining that the first coherence value is below a coherence threshold, in response, combining the sub-band impulse responses using a non-linear interpolation technique to generate an estimated impulse response for the first frequency sub-band for the target location, generating, based on the estimated impulse response, a filter for a speaker, filtering an audio signal, and causing the speaker to output the filtered audio signal.

20 Claims, 5 Drawing Sheets

INTERPOLATION OF FINITE IMPULSE RESPONSE FILTERS FOR GENERATING SOUND FIELDS

BACKGROUND

Field of the Various Embodiments

Embodiments of the present disclosure relate generally to audio reproduction and, more specifically, to interpolation of finite impulse response filters for generating sound fields.

DESCRIPTION OF THE RELATED ART

Audio processing systems use one or more speakers to produce sound in a given space. The one or more speakers generate a sound field, where a user in the environment receives the sound included in the sound field. When the user hears the sound, the user determines a spatial point from which the sound appears to originate. Various audio processing systems perform audio processing and reproduction techniques to reproduce two-dimensional or three-dimensional audio, where the user hears the reproduced audio as appearing to come from one or more specific originating points in the environment. When generating the sound field, an audio processing system uses one or more finite impulse response (FIR) filters to generate the sounds that create the sound field. For example, the audio processing system uses a sparse set of FIR filters to estimate the impulse response at various locations within the sound field. Using such methods, the audio processing system determines the impulse response of the sound field at a given point in space and adjusts the audio output based on the impulse response.

At least one drawback with conventional audio processing systems is that such audio processing systems do not provide an audio output based on an accurate sound field for all locations within the sound field. For example, audio processing systems use a sparse set of FIR filters to generate portions of the sound field for a limited number of locations in the environment and use linear interpolation to estimate impulse responses for other locations in the environment. However, such audio processing systems do not account for many characteristics of the sound field and cannot accurately estimate impulse responses for all the locations in the sound field. For example, sound fields that are produced from highly-directive sources and sound fields having complex structures vary greatly over different locations in the environment. In such instances, the audio processing systems require higher spatial sampling of impulse responses. As a result, the audio processing systems require a larger number of FIR filters for additional locations in the environment, or otherwise do not accurately estimate the impulse response at specific locations in the environment. The error in estimation causes errors in audio reproduction and degrades the auditory experience for the user.

As the foregoing illustrates, what is needed in the art are more effective techniques for generating sound fields in an environment.

SUMMARY

Various embodiments disclose a computer-implemented method comprising determining a target location in an environment, determining a set of sub-band impulse responses for a first frequency sub-band, each sub-band impulse response in the set of sub-band impulse responses being associated with a corresponding location that is proximate to the target location, selecting a first pair of sub-band impulse responses for the first frequency sub-band from among pairs of sub-band impulse responses in the set of sub-band impulse responses, computing a first coherence value indicating a level of coherence between sub-band impulse responses in the first pair, determining that the first coherence value is below a coherence threshold, in response to determining that the first coherence value is below the coherence threshold, combining the sub-band impulse responses in the first pair using a non-linear interpolation technique to generate an estimated impulse response for the first frequency sub-band for the target location, generating, based at least on the estimated impulse response, a filter for a speaker, filtering, by the filter, an audio signal to generate a filtered audio signal, and causing the speaker to output the filtered audio signal.

Further embodiments provide, among other things, one or more non-transitory computer-readable media and systems configured to implement the method set forth above.

At least one technical advantage of the disclose techniques relative to the prior art is that, with the disclosed techniques, an audio processing system can more accurately generate a sound field for a particular location in an environment, which increases the auditory experience of a user at the particular location. Further, the disclosed techniques are able to generate impulse response filters more accurately for the particular location from a smaller set of impulse response filters than prior art techniques. The disclosed techniques therefore reduce the memory used by the audio processing system when estimating impulse responses at particular locations. Further, the disclosed techniques reduce the time spent collecting measurements of impulse responses at locations within a listening environment that are needed to generate an accurate sound field. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
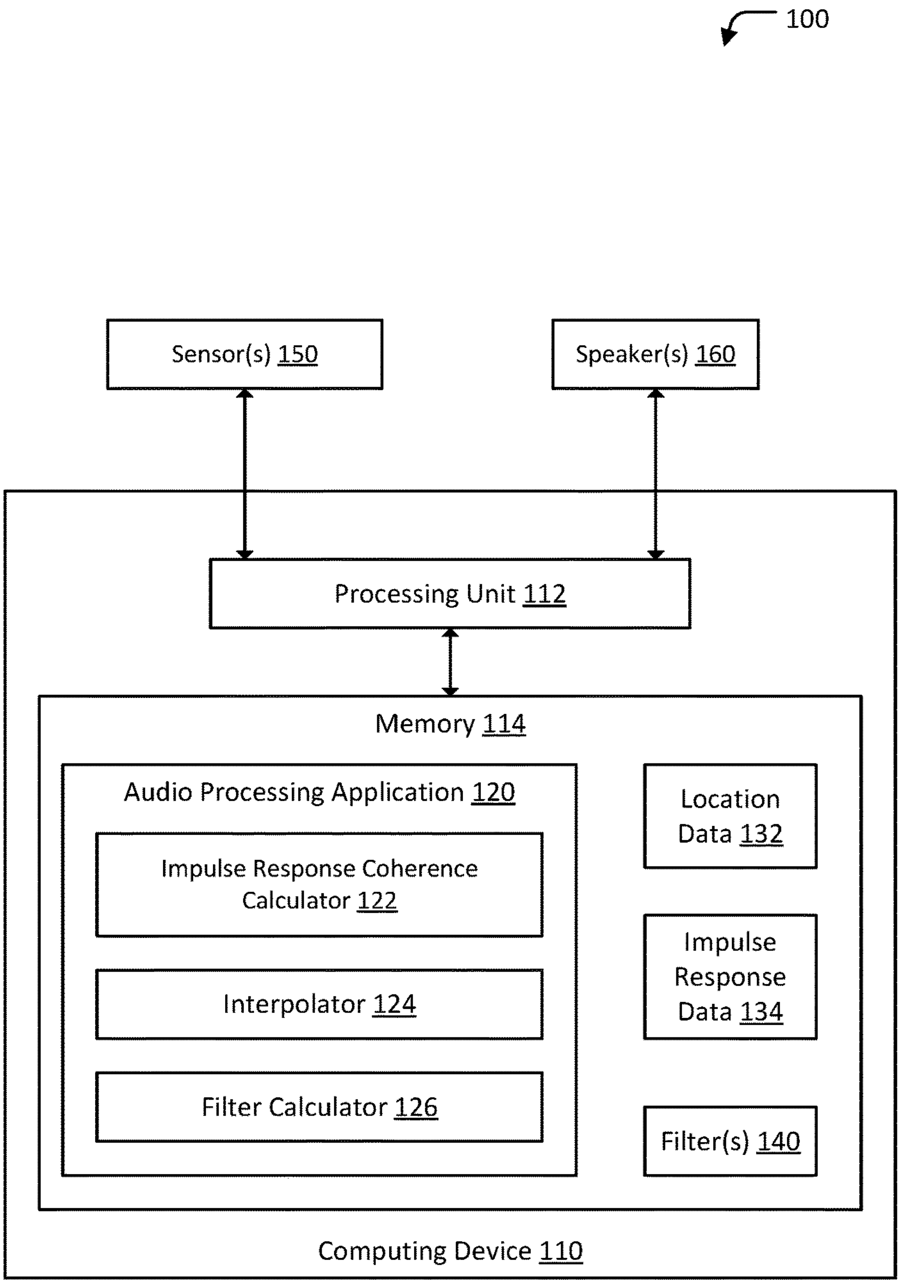
FIG. 1 is a schematic diagram illustrating an audio processing system according to various embodiments.

FIG. 1 is a schematic diagram illustrating an audio processing system 100 according to various embodiments. As shown, the audio processing system 100 includes, without limitation, a computing device 110, one or more sensors 150, and one or more speakers 160. The computing device 110 includes, without limitation, a processing unit 112 and memory 114. The memory 114 stores, without limitation, an audio processing application 120, location data 132, impulse response data 134, and one or more filters 140. The audio processing application 120 includes, without limitation, an impulse response coherence calculator 122, an interpolator, 124, and a filter calculator 126.

In operation, the audio processing system 100 processes sensor data from the one or more sensors 150 to track the location of one or more listeners within the listening environment to identify one or more target locations within the listening environment. The audio processing application 120 included in the audio processing system 100 retrieves measured impulse responses for various locations within the listening environment and selects a subset of the measured impulse responses surrounding each target location. The impulse response coherence calculator 122 processes the selected measured impulse responses to determine a set of impulse responses to use and whether to use linear or non-linear interpolation to estimate the impulse response over a given frequency range for the target location. The interpolator 124 uses the determined interpolation technique to generate an estimated impulse response for the target location. The filter calculator sets the parameters for the filters 140 based at least on the estimated impulse response at the target location. The audio processing application 120 uses the filters 140 that are generated according to the parameters to filter an audio signal and reproduce a sound field within the listening environment.

The computing device 110 is a device that drives speakers 160 to generate, in part, a sound field. In various embodiments, the computing device 110 is a central unit in a home theater system, a soundbar, a vehicle system, and so forth. In some embodiments, the computing device 110 is included in one or more devices, such as consumer products (e.g., portable speakers, gaming, gambling, etc. products), vehicles (e.g., the head unit of a car, truck, van, etc.), smart home devices (e.g., smart lighting systems, security systems, digital assistants, etc.), communications systems (e.g., conference call systems, video conferencing systems, speaker amplification systems, etc.), and so forth. In various embodiments, the computing device 110 is located in various environments including, without limitation, indoor environments (e.g., living room, conference room, conference hall, home office, etc.), and/or outdoor environments, (e.g., patio, rooftop, garden, etc.).

The processing unit 112 can be any suitable processor, such as a central processing unit (CPU), a graphics processing unit (GPU), an application-specific integrated circuit (ASIC), a field programmable gate array (FPGA), a digital signal processor (DSP), and/or any other type of processing unit, or a combination of different processing units, such as a CPU configured to operate in conjunction with a GPU. In general, the processing unit 112 can be any technically feasible hardware unit capable of processing data and/or executing software applications.

Memory 114 can include a random-access memory (RAM) module, a flash memory unit, or any other type of memory unit or combination thereof. The processing unit 112 is configured to read data from and write data to the memory 114. In various embodiments, the memory 114 includes non-volatile memory, such as optical drives, magnetic drives, flash drives, or other storage. In some embodiments, separate data stores, such as an external data stores included in a network ("cloud storage") can supplement the memory 114. The audio processing application 120 within the memory 114 can be executed by the processing unit 112 to implement the overall functionality of the computing device 110 and, thus, to coordinate the operation of the audio processing system 100 as a whole. In various embodiments, an interconnect bus (not shown) connects the processing unit 112, the memory 114, the speakers 160, the sensors 150, and any other components of the computing device 110.

The audio processing application 120 executes various techniques to determine the location of a listener within a listening environment and sets the parameters for one or more filters 140 to generate a sound field for the location of the listener. In various embodiments, the audio processing application 120 receives location data 132 to identify the location of the listener and receives and impulse response data 134 for various locations where an impulse response within the listening environment has been determined. The audio processing application 120 uses the location data 132 to set the location of the listener as the target location. The target location is then used to select measured impulse responses near the target location from the impulse response data 134. For example, the audio processing application 120 acquires the location data 132 from the sensors 150 (e.g., received optical data and/or other tracking data) to determine the position of the listener. The audio processing application 120 also acquires the impulse response data 134 to determine the locations within the listening environment where impulse responses were measured. Based on the locations of the measured impulse responses, the audio processing application 120 estimates the impulse response at the target location and updates the impulse response data 134 that is used to set the parameters for the filters 140. In some embodiments, the audio processing application 120 sets the parameters for multiple filters 140 corresponding to multiple speakers 160. Additionally or alternatively, the audio processing application 120 tracks the positions of multiple listeners. In such instances, the audio processing application 120 determines multiple target locations and estimates impulse responses at each of the target locations. The audio processing application 120 can then update the impulse response data 134 to include each of the estimated impulse responses.

The filters 140 include one or more filters that modify an input audio signal. In various embodiments, a given filter 140 modifies the input audio signal by modifying the energy within a specific frequency range, adding directivity information, and so forth. For example, the filter 140 can include filter parameters, such as a set of values that modify the operating characteristics (e.g., center frequency, gain, Q factor, cutoff frequencies, etc.) of the filter 140. In some embodiments, the filter parameters include one or more digital signal processing (DSP) coefficients that steer the generated soundwave in a specific direction. In such instances, the generated filtered audio signal is used to generate a soundwave in the direction specified in the filtered audio signal. For example, the one or more speakers 160 reproduce using one or more filtered audio signals to generate a sound field. In some embodiments, the audio processing application 120 sets separate filter parameters for separate filters 140. In such instances, one or more speakers 160 generate the sound field using the separate filters 140.

For example, each filter 140 can generate a filtered audio signal for a single speaker 160 within the listening environment.

The impulse response data 134 includes measured impulse responses within the listening environment. The impulse response data 134 includes a set of measured impulse responses at locations within the listening environment. In some embodiments, the impulse response data 134 also includes previously estimated impulse responses. In such instances, the audio processing application 120 checks the impulse response data 134 for a previously estimated impulse response for the target location before generating an estimated impulse response for the target location.

In some embodiments, the impulse response data 134 includes filter parameters for one or more filters 140, such as one or more finite impulse response (FIR) filters. In various embodiments, the audio processing application 120 initially sets filter parameters for filters 140 corresponding to each speaker 160 and updates the filter parameters for a specific speaker (e.g., a first filter 140(1) for a first speaker 160(1)) when the listener moves. For example, the audio processing application 120 can initially generate filter parameters for a set of filters 140. Upon determining that the listener has moved to a new location, the audio processing application 120 then determines whether any of the speakers 160 require updates to the corresponding filters 140. The audio processing application 120 updates the filter parameters for any filter 140 that requires updating. In some embodiments, audio processing application 120 generates each of the filters 140 independently. For example, upon determining that a listener has moved, the audio processing application 120 can update the filter parameters for a single filter 140 (e.g., 140(1) for a specific speaker 160 (e.g., 160(1)). Alternatively, the audio processing application 120 updates multiple filters 140. In some embodiments, the audio processing application 120 uses multiple filters 140 to modify the audio signal. For example, the audio processing application 120 can use a first filter 140(1) to add directivity information to an audio signal and can use separate filters 140, such as equalization filters, spatialization filters, etc., to further modify the audio signal.

The location data 132 is a dataset that includes positional information for one or more locations within the listening environment. In some embodiments, the location data 132 includes specific coordinates relative to a reference point. For example, the location data 132 can store the current positions and/or orientations of each respective speaker 160 as a distance and angle from a specific reference point. In some embodiments, the location data 132 can include additional orientation information, such as a set of angles (e.g., $\{\mu, \varphi, \psi\}$) relative to a normal orientation. In such instances, the position and orientation of a given speaker 160 is stored in the location data 132 as a set of distances and angles relative to a reference point. In various embodiments, the location data 132 also includes computed directions between points. For example, the audio processing application 120 can compute the direction of the target location and/or a specific listener relative to the position and orientation of the speaker 160 and can store the direction as a vector in the location data 132. In such instances, the audio processing application 120 retrieves the stored direction when setting the filter parameters of the one or more filters 140.

The sensors 150 include various types of sensors that acquire data about the listening environment. For example, the computing device 110 can include auditory sensors to receive several types of sound (e.g., subsonic pulses, ultrasonic sounds, speech commands, etc.). In some embodiments, the sensors 150 includes other types of sensors. Other types of sensors include optical sensors, such as RGB cameras, time-of-flight cameras, infrared cameras, depth cameras, a quick response (QR) code tracking system, motion sensors, such as an accelerometer or an inertial measurement unit (IMU) (e.g., a three-axis accelerometer, gyroscopic sensor, and/or magnetometer), pressure sensors, and so forth. In addition, in some embodiments, sensor(s) 150 can include wireless sensors, including radio frequency (RF) sensors (e.g., sonar and radar), and/or wireless communications protocols, including Bluetooth, Bluetooth low energy (BLE), cellular protocols, and/or near-field communications (NFC). In various embodiments, the audio processing application 120 uses the sensor data acquired by the sensors 150 to generate the location data 132. For example, the computing device 110 includes one or more emitters that emit positioning signals, where the computing device 110 includes detectors that generate auditory data that includes the positioning signals. In some embodiments, the audio processing application 120 combines multiple types of sensor data. For example, the audio processing application 120 can combine auditory data and optical data (e.g., camera images or infrared data) in order to determine the position and orientation of the listener at a given time.

Figure 2:
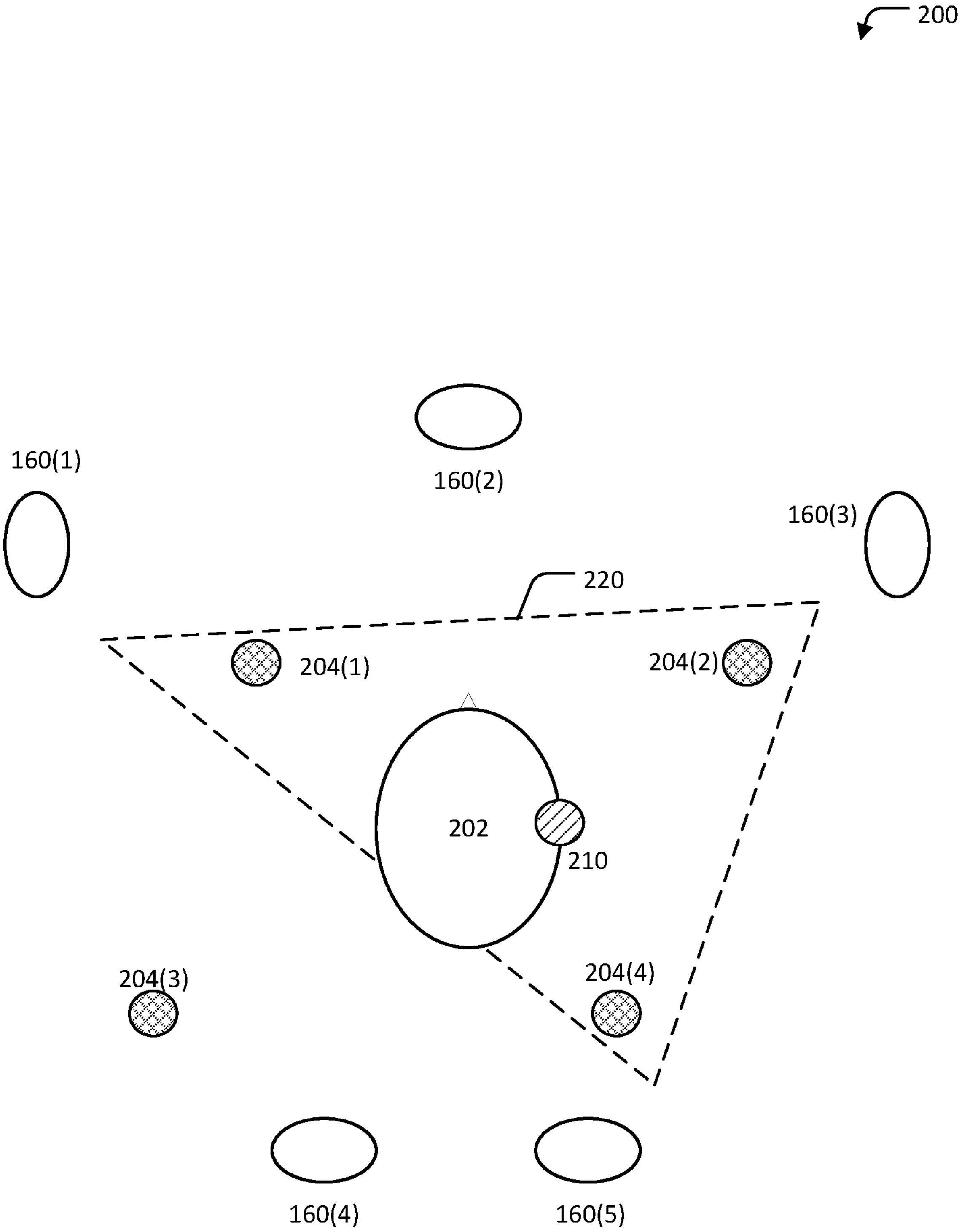
FIG. 2 illustrates an example speaker arrangement of the audio processing system of FIG. 1 within a listening environment, according to various embodiments.

FIG. 2 illustrates an example speaker arrangement of the audio processing system 100 of FIG. 1 within a listening environment 200, according to various embodiments. As shown, and without limitation, the listening environment 200 includes a listener 202, a set of speakers 160(1)-160(5), stored impulse response locations 204, a target location 210, and an impulse response subset 220.

Each speaker 160 is physically located at a different position within the listening environment. At various times, the impulse response at a given location is determined. For example, each speaker 160(1)-160(5) can emit an audio impulse and a microphone positioned at the given location (e.g., location 204(1)) can record the impulse response. In such instances, the impulse response can be separately measured for an audio impulse emitted by each of the speakers 160(1)-160(5). Upon recording the impulse response, the measured impulse response and the corresponding impulse response location 204 can be stored in the impulse response data 134. In some embodiments, the audio processing application 120 generates an estimated impulse response for a target location 210. In such instances, the audio processing application 120 stores the estimated impulse response and the corresponding location (e.g., setting the target location 210 as a stored impulse response location 204) in the impulse response data 134. In various embodiments, the group of stored impulse responses and stored impulse response locations 204 acts as a sparse set of known impulse responses for which the audio processing application 120 can determine the impulse responses at other locations.

A listener 202 is positioned in proximity to one or more of the speakers 160. As shown in the embodiments of FIG. 2, the listener 202 is oriented such that the front of listener 202 is facing speaker 160(2). Speakers 160(1) and 160(3) are positioned to the front left and front right, respectively, of the listener 202. Speakers 160(4) and 160(5) are positioned behind the listener 202. In some embodiments, speakers 160(4) and 160(5) form a dipole group.

Listener 202 listens to sounds emitted by the audio processing system 100 via the speakers 160. As shown in FIG. 2, the listener 202 is associated with a target location 210 (e.g., a specific ear or ears of the listener, a center point between the ears of the listener, and/or the like) within the listening environment 200. In various embodiments, the audio processing system 100 outputs a sound field that is heard by listener 202. In order to generate the filters 140 for speakers 160, the audio processing application 120 first determines whether an impulse response was measured at the target location 210. When audio processing application 120 determines that an impulse response was measured at the target location 210 or determines that an impulse response for the target location 210 has already been estimated (e.g., the impulse response data 134 includes stored impulse response for the target location 210), the audio processing application 120 sets filters 140 based on the impulse response for the target location 210. Otherwise, the audio processing application 120 determines that an impulse response for the target location 210 cannot be retrieved and generates an estimated impulse response for the target location 210.

In some embodiments, the measured impulse responses for the listening environment 200 include measured impulse responses at various locations 204 (e.g., 204(1)-204(4)) within the listening environment 200. The audio processing application 120 identifies two or more locations within the listening environment 200 that are near to target location and for which an impulse response has been measured. For example, the subset 220 could include impulse responses measured at locations 204(1), 204(2), and 204(4). In some embodiments, the audio processing application 120 use a set of criteria to determine the subset 220. For example, the audio processing application 120 can select the three nearest locations 204, measured by Euclidean distance in space and/or a perceived spatial auditory distance to the target location 210, that combine to surround the target location 210.

In some embodiments, the audio processing application 120 determines the specific stored locations 204 to include in the subset 220 using a set of one or more heuristics and/or rules in addition to or in lieu of distance to the target location 210. The set of one or more heuristics and/or rules could consider, the number of listeners 202 (e.g., 202(1), 202(2), etc.) within the listening environment 200, the position of the listener(s) 202, the orientation of the listener(s) 202, the number of speakers 160 in the audio processing system 100, the location of the speakers 160, whether a pair of speakers 160 form a dipole group, the position of the speakers 160 relative to the position of the listener(s) 202, the type of listening environment, and/or other characteristics of the listening environment 200 and/or the audio processing system 100. The specific heuristics and/or rules may vary, for example, depending on the audio processing system 100, the listening environment 200, the type of audio being played, user-specified preferences (e.g., noise cancellation mode), and so forth.

Figure 3:
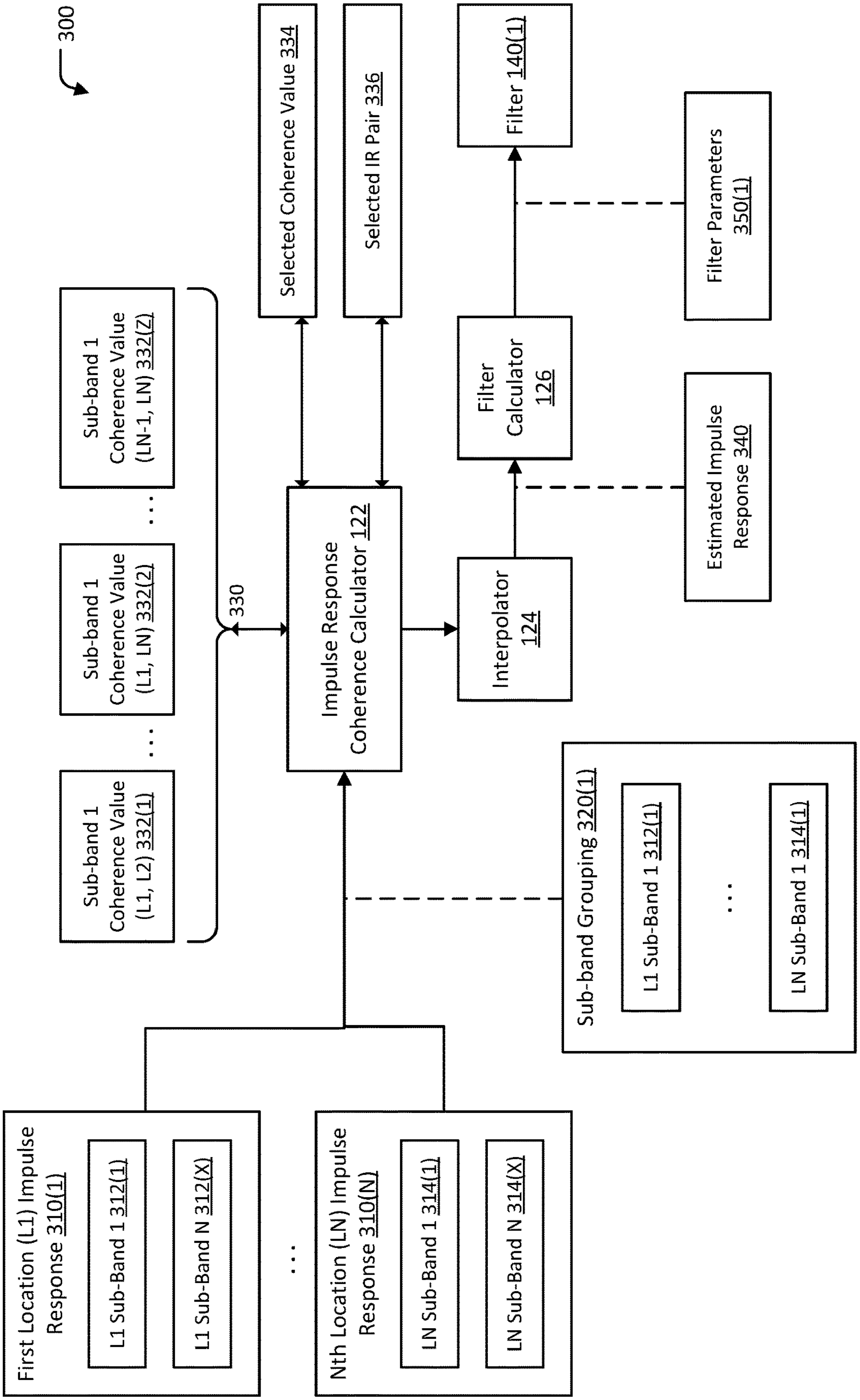
FIG. 3 is a technique for generating an estimated impulse response at a target location, according to various embodiments.

FIG. 3 is a technique for generating an estimated impulse response 340 at a target location 210, according to various embodiments. As shown, the audio processing system 100 includes the impulse response coherence calculator 122, the interpolator 124, the filter calculator 126, and the filter 140(1).

In various embodiments, the audio processing application 120 selects a subset 220 of stored impulse responses 310(1)-310(N) for locations 204 that are near the target location 210. In some embodiments, the audio processing application 120 selects for the subset 220 each stored impulse response 310 that was measured at a location within a threshold distance of the target location 210 (e.g., N locations within a threshold distance). For example, the audio processing application 120 can select 4 impulse responses that are located within a threshold distance of the target location 210. Additionally or alternatively, the audio processing application 120 selects a specific number of measured impulse responses 310, such as the three closest locations (measured by the distance) that form an area encompassing at least a portion of the target location 210.

In various embodiments, the audio processing application 120 separates each measured impulse response 310 into sub-band impulse responses 312, 314. For example, the audio processing application 120 decomposes each of the N stored impulse responses 310(1)-310(N) (where N≥2) included in the subset 220 into separate groups of signals corresponding to impulse responses for a specific sub-band (e.g., decomposing the impulse response 310(1) into X sub-band impulse responses 312(1)-312(X) corresponding to X separate sub-bands and similarly for stored impulse responses 310(2)-310(N)). Alternatively, in some embodiments, the audio processing application 120 retrieves sub-band impulse responses that were previously decomposed and stored. The audio processing application 120 groups the sub-band impulse responses into X separate sub-band groupings 320(1)-320(X). For example, upon decomposing each of the N impulse responses in the subset 220 (e.g., decomposing the first impulse response 310(1) through the Nth impulse response 310(N)) into separate sub-band impulse responses 312(1)-312(X), . . . 314(1)-314(X), the audio processing application 120 generates a sub-band grouping 320(1) for the first sub-band that includes each of the impulse responses for the first sub-band. In various embodiments, the audio processing application 120 also generates separate sub-band groupings 320(2)-320(X) (not shown) that correspond to the other sub-bands.

In various embodiments, the impulse response coherence calculator 122 included in the audio processing application 120 iteratively calculates a separate coherence value 332 (e.g., 332(1)-332(Z)) for each paired combination of the sub-band impulse responses 312, 314 included in the sub-band grouping 320. The impulse response coherence calculator 122 generates the coherence value set 330 for the sub-band grouping 320, where the coherence value set 330 includes coherence values 332(1)-332(Z) for each paired combination of sub-band, where Z is equivalent to $$\binom{N}{2}$$

combinations of pairs of sub-band impulse responses within the sub-band grouping 320. The impulse response coherence calculator 122 selects two sub-band impulse responses (e.g., 312(1) and 314(1)) from the sub-band grouping 320 and computes the coherence value (e.g., 332(2)) for the paired combination.

In various embodiments, the impulse response coherence calculator 122 initially computes the coherence signal between two sub-band impulse responses. In some embodiments, the coherence value 332 can be a magnitude-squared coherence signal that is a function of a first sub-band impulse response (e.g., x(ω)) and a second sub-band impulse response (e.g., y(ω)):

$$C_{xy}(\omega) = \frac{S_{yx}(\omega)}{\sqrt{S_{xx}(\omega)S_{yy}(\omega)}} \quad \text{Eq. 1}$$

Where $S_{xx}$ and $S_{yy}$ are the power-spectral densities (PSDs) of the first and second sub-band impulse responses, respectively, and $S_{yx}$ is the cross-spectral density between the first and second sub-band impulse responses. In such instances, the impulse response coherence calculator 122 can store the coherence signal as the coherence value 332.

In some embodiments, the impulse response coherence calculator 122 can determine a single coherence value from the coherence signal (e.g., averaging the coherence signal). Alternatively, in some embodiments, the impulse response coherence calculator 122 generates a single coherence value directly from the two sub-band impulse responses included in the paired combination. Upon calculating the coherence value 332, the impulse response coherence calculator 122 adds the coherence value 332 for the paired combination into the coherence value set 330. In some embodiments, the impulse response coherence calculator 122 includes an index that maps coherence value 332 to the associated pair of sub-band impulse responses.

In various embodiments, the impulse response coherence calculator 122, upon determining that the coherence value set 330 for the sub-band grouping 320 is complete, selects an impulse response pair 336 and a corresponding coherence value 334 based on the coherence values 332 included in the coherence value set 330. In some embodiments, the impulse response coherence calculator 122 selects the impulse response pair 336 from the impulse response pairs that has a highest corresponding coherence value 332. For example, when each coherence value 332 is a single value, the impulse response coherence calculator 122 determines the maximum coherence value from the coherence value set 330. The impulse response coherence calculator 122 selects the impulse response pair 336 corresponding to the maximum coherence value and sets the selected coherence value 334 equal to the maximum coherence value. In some embodiments, the coherence values 332 varies over the frequency range of the sub-band. In such instances, the impulse response coherence calculator 122 the maximum average value and selects the impulse response pair 336. Alternatively, the impulse response coherence calculator 122 selects an impulse response pair 336 corresponding to a specific coherence value 332 from the coherence value set 330 using different criteria. For example, the impulse response coherence calculator 122 can select the impulse response pair 336 having a coherence value 332 corresponding to the median, mean, or minimum value in the coherence value set 330.

In various embodiments, the interpolator 124 compares the selected coherence value 334 to a coherence threshold. In some embodiments, two or more sub-bands share a common coherence threshold. Alternatively, the interpolator 124 maintains separate coherence thresholds for each sub-band. When the interpolator 124 determines that the selected coherence value 334 is equal to or above the coherence threshold, the interpolator 124 determines to use linear interpolation to generate the portion of the estimated impulse response 340. For example, the interpolator 124 can use a specific linear interpolation technique such as weighted interpolation, where the interpolator 124 estimates the impulse response as inversely proportional to the distance between the target location 210 and the respective locations 204 of each of the sub-band impulse responses included in the selected impulse response pair 336. Otherwise, the interpolator 124 determines that the selected coherence value 334 is below the coherence threshold and selects a non-linear interpolation technique to generate the portion of the estimated impulse response 340.

In some embodiments, the interpolator 124 selects a non-linear interpolation technique from a group of available non-linear interpolation techniques. For example, the interpolator 124 can select a non-linear interpolation technique that uses at least the impulse responses from the selected impulse response pair 336. In various embodiments, the interpolator 124 can select one of a Lagrange interpolation, a least-squares interpolation, a bicubic spline interpolation, a cosine interpolation, or a parabolic interpolation. Alternatively, the interpolator 124 can set one of the impulse responses included in the selected impulse response pair 336 as the estimated impulse response 340.

In various embodiments, the filter calculator 126 sets one or more filter parameters 350 based at least one the estimated impulse response 340. In various embodiments, the filter calculator 126 determines filter parameters 350, which include a set of values that modify the operating characteristics (e.g., center frequency, gain, Q factor, cutoff frequencies, etc.) of the filter 140. In such instance, the filter calculator 126 modifies the filter parameters 350 such that the filter 140 enables the corresponding speaker to generate a specific sound filed. For example, the filter parameters 350 can include one or more DSP coefficients that steer the generated soundwave in a specific direction. In various embodiments, the filter calculator 126 uses the estimated impulse response 340 to set filter parameters 350 to ensure that the sound field accurately reproduces the audio signal at the target location 210.

Figure 4:
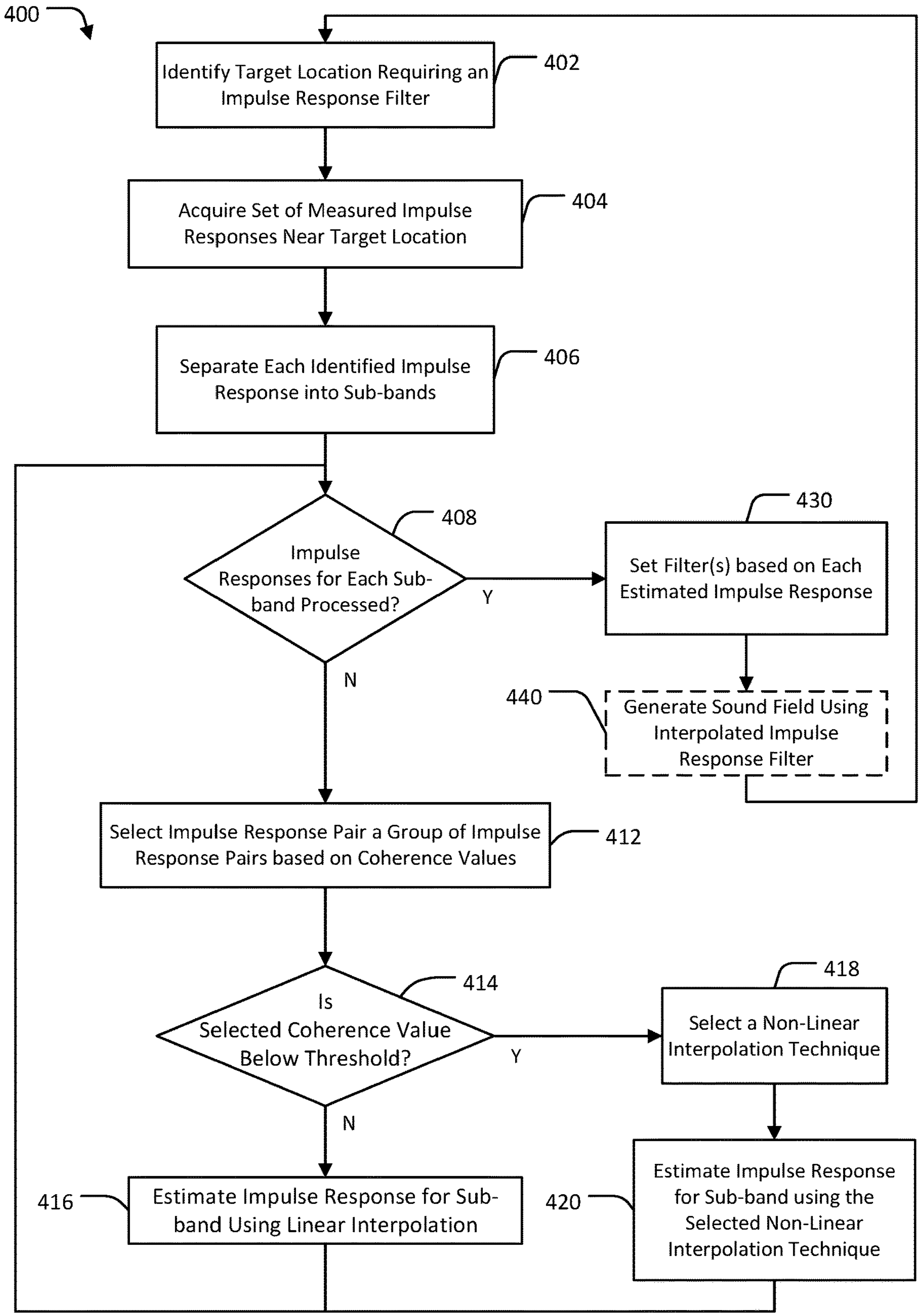
FIG. 4 sets forth a flow chart of method steps for generating a filter for a speaker based on an estimated impulse response for a target location, according to various embodiments.

FIG. 4 sets forth a flow chart of method steps for generating a filter for a speaker based on an estimated impulse response for a target location, according to one or more embodiments. Although the method steps are described with reference to the systems and embodiments of FIGS. 1-3, persons skilled in the art will understand that any system configured to implement the method steps, in any order, falls within the scope of the present disclosure.

As shown, the method 400 begins at step 402, where the audio processing application 120 identifies a location requiring an estimated impulse response. In various embodiments, the audio processing application 120 determines a target location 210 within a listening environment 200 for which an accurate sound field is to be produced. For example, the audio processing application 120 acquires tracking data from one or more sensors 150 that indicate the location of a listener within the listening environment 200.

At step 404, the audio processing application 120 acquires a set of stored impulse responses 310 near the target location 210. In various embodiments, the audio processing application 120 identifies two or more measured impulse responses for locations 204 within the listening environment 200 that are proximate to the target location 210. For example, the audio processing application 120 retrieves impulse response data 134 that includes a dataset mapping various measured impulse responses in the environment to corresponding locations 204 in the listening environment 200. In some embodiments, the dataset includes a sparse set of stored impulse responses 310. For example, the dataset can include a small group of stored impulse responses 310 that were measured at predetermined positions within the listening environment 300 (e.g., various positions within a room).

In various embodiments, the audio processing application 120 selects from the dataset a subset 220 of stored impulse responses 310 corresponding to locations 204 near the target location 210. In some embodiments, the audio processing application 120 selects each stored impulse response for a location within a threshold Euclidean or perceived audio distance of the target location 210. Additionally or alternatively, the audio processing application 120 selects from the dataset a specific number of stored impulse responses 310, such as stored impulse responses for three locations 204 closest to the target location 210 by Euclidean or perceived audio distance that also form an area encompassing at least a portion of the target location 210. In some embodiments, the audio processing application 120 can use other criteria and/or employ other heuristics to add impulse responses from the dataset in the impulse response data 134 into the subset 220.

At step 406, the audio processing application 120 separates each stored impulse response into responses for multiple frequency sub-bands. In various embodiments, the audio processing application 120 decomposes each of the stored impulse responses 310 included in the subset 220 of stored impulse responses to generate a plurality of signals corresponding to frequency impulse responses for a specific sub-band frequency range. In some embodiments, the audio processing application 120 uses a filter bank, separate from the filters 140, to generate the respective sub-band impulse responses. For example, the audio processing application 120 can use a filter bank of separate bandpass filters, DSP-based bandpass filters, and/or the like. In various embodiments, the audio processing application 120 groups sub-band impulse responses by frequency sub-band. For example, upon decomposing each of the N impulse responses in the subset 220 (e.g., each of the first impulse response 310(1) through the Nth impulse response 310(N)) into X separate sub-band impulse responses 312(1)-312(X), . . . 314(1)-312(X), the audio processing application 120 generates a sub-band grouping 320(1) for the first frequency sub-band that includes each of the N impulse responses for the first frequency sub-band. In such instances, the audio processing application 120 repeats steps 408-420 for each of the X−1 remaining sub-band groupings 320(2)-320(X).

At step 408, the audio processing application 120 determines whether each sub-band grouping 320 has been processed. In various embodiments, the audio processing application 120 determines whether each of X sub-band groupings 320 has been processed by determining whether the audio processing application 120 has generated estimated impulse responses 340(1)-340(X) for each sub-band grouping 320(1)-320(X). When the audio processing application 120 determines that each sub-band grouping 320(1)-320(X) has a corresponding estimated impulse response 340(1)-340(X), the audio processing application 120 proceeds to step 430. Otherwise, the audio processing application 120 determines that the impulse responses for each sub-band grouping 320 has not been processed and responds by selecting an unprocessed sub-band grouping 320 and proceeds to step 412.

At step 412, the audio processing application 120 selects impulse response pair a based on coherence values for a group of impulse response pairs. In various embodiments and as will be discussed further in relation to FIG. 5, the impulse response coherence calculator 122 included in the audio processing application 120 iteratively calculates separate coherence values 332 based on the spectral densities of the respective impulse responses. In some embodiments, the coherence value is based on a cross-spectral density between two impulse responses and indicates the coherence between pairs of sub-band impulse responses included in the sub-band grouping 320. Upon computing each coherence value 332, the audio processing application 120 selects a sub-band impulse response pair 336 and corresponding coherence value 334.

For example, when computing a coherence value 332 for a pair of sub-band impulse responses, the audio processing application 120 initially computes a coherence signal between two sub-band impulse responses, then determines a single coherence value by averaging the coherence signal. Upon calculating the coherence value 332, the audio processing application 120 adds the coherence value for the paired combination of sub-band impulse responses to a coherence value set 330. When the coherence value set 330 is complete, the audio processing application 120 identifies a coherence value from the coherence value set 330 that meets specific criteria. The audio processing application 120 selects an impulse response pair 336 that produced the identified coherence value. In various embodiments, the impulse response coherence calculator 122 compares the coherence values 332 included in the coherence value set 330 and determines a coherence value from the coherence value set 330 that meets one or more criteria. In some embodiments, the impulse response coherence calculator 122 selects the highest value coherence values 332 and selects the pair of sub-band impulse responses that have the corresponding coherence value.

At step 414, the audio processing application 120 determines whether the selected coherence value corresponding to the selected impulse response pair 336 is below a coherence threshold. In various embodiments, the interpolator 124 compares the selected coherence value 334, which is equal to the coherence value corresponding to the selected impulse response pair 336, to a coherence threshold. In some embodiments, the audio processing application 120 uses a same coherence threshold for multiple sub-bands. Alternatively, each sub-band has a distinct coherence threshold. When the interpolator 124 determines that the selected coherence value 334 is equal to or above the coherence threshold, the interpolator 124 proceeds to step 416. Otherwise, the interpolator 124 determines that the selected coherence value 334 is below the coherence threshold and proceeds to step 418.

At step 416, the audio processing application 120 estimates the impulse response for the sub-band using a linear interpolation technique. In various embodiments, the interpolator 124 uses a linear interpolation technique to generate a portion of the estimated impulse response 340 for the target location 210. In some embodiments, the interpolator uses one or more additional sub-band impulse responses 312(1)-314(1) included in the sub-band grouping 320 during the linear interpolation. Upon the interpolator 124 generating the portion of the estimated impulse response 340, the audio processing application 120 returns to step 408 to process any of the remaining sub-band groupings 320.

At step 418, the audio processing application 120 selects a non-linear interpolation technique. In various embodiments, upon the impulse response coherence calculator 122 determining that the selected coherence value 334 is below the coherence threshold, the interpolator 124 selects a non-linear interpolation technique. For example, the interpolator 124 selects a non-linear interpolation technique for combining the selected impulse response pair 336. For example, the interpolator 124 can select one of a Lagrange interpolation, a least-squares interpolation, a bicubic spline interpolation, a cosine interpolation, or a parabolic interpolation. Alternatively, the interpolator can select the closest impulse response from the selected impulse response pair (e.g., nearest-neighbor interpolation).

At step 420, the audio processing application 120 estimates the impulse response for the sub-band using the selected non-linear interpolation technique. In various embodiments, the interpolator 124 generates a portion of the estimated impulse response 340 for the frequency sub-band using the selected non-linear interpolation technique. The number of sub-band impulse responses 312(1)-314(1) that the interpolator 124 uses when generating the portion of the estimated impulse response 340 varies based on the selected non-linear technique. For example, when the selected non-linear interpolation technique uses data from three or more impulse responses, the interpolator 124 selects additional sub-band impulse responses from the sub-band grouping 320 when generating the portion of the estimated impulse response. In another example, when the selected non-linear interpolation technique uses data from one or two impulse responses, the interpolator 124 uses one or both of the selected impulse response pair 336 to generate the portion of the estimated impulse response 340. Upon the interpolator 124 generating the portion of the estimated impulse response 340 for the frequency sub-band, the audio processing application 120 returns to step 408 to process any of the remaining sub-band groupings 320.

At step 430, the audio processing application 120 generates a filter based on a complete estimated impulse response. In various embodiments, upon the interpolator 124 completing the estimated impulse response 340, the filter calculator 126 sets one or more filter parameters 350 based at least one the estimated impulse response 340. In various embodiments, the filter calculator 126 determines a set of filter parameters 350 that modify the operating characteristics (e.g., center frequency, gain, Q factor, cutoff frequencies, etc.) of the filter 140.

At step 440, the audio processing application 120 drives the speaker 160 to generate a sound field using the filter 140 generated in step 430. In various embodiments, upon setting the filter 140, the audio processing application 120 drives the speaker 160 to generate a portion of a sound field. The audio processing application 120 drives the speaker 160 to process an audio signal using the filter 140 to generate a filtered audio signal. In some embodiments, the filtered audio signal includes directivity information corresponding to the direction towards the target location 210 relative to the specific position of the speaker 160 (e.g., the position and/or orientation of the speaker 160). The speaker 160 reproduces the filtered audio signal, generating an audio output corresponding to the filtered audio signals created by the filter 140. For example, the audio processing application 120 drives the speaker 160 to generate a set of soundwaves in the direction toward the target location 210. In various embodiments, the set of soundwaves that the speaker 160 generates combines with other soundwaves produced by other speakers 160 to generate a sound field that accurately reflects the estimated impulse response 340. In some embodiments, the audio processing application 120 returns to step 402 to determine whether the target location 210 has changed.

In some embodiments, the audio processing application 120 repeats steps 404-430 for each speaker 160 that is to produce the sound field. For example, the audio processing application 120 uses the estimated impulse response 340 for each speaker 160 to generate distinct filter parameters 350 for the respective filters 140 of each speaker 160 in the listening environment 200. Alternatively, in some embodiments, the audio processing application 120 repeats steps 402-430 for subsets of speakers 160 that generate different sound fields. For example, the audio processing device can determine distinct filter parameters 350 for the respective filters 140 of separate subsets of speakers 160 in the listening environment 200 that are to generate different sound fields for different target locations (e.g., separate sound fields for passengers in a vehicle).

In some embodiments, the audio processing application 120 tracks multiple listeners. In such instances, the audio processing application 120 can separately set the location of the respective listeners as one of multiple target locations 210 requiring an estimated impulse response. The audio processing application 120 repeats steps 404-430 to generate sound fields for each of the respective target locations 210. For example, the audio processing application 120 initially determines a first estimated impulse response for a first location corresponding to a first listener, generates a sound field for the first listener, and then determines a second estimated impulse response for a second location corresponding to a second listener. In some embodiments, the audio processing application 120 can set different filter parameters 350 for different subsets of speakers 160 to generate separate sound fields for each of the respective target locations 210.

Figure 5:
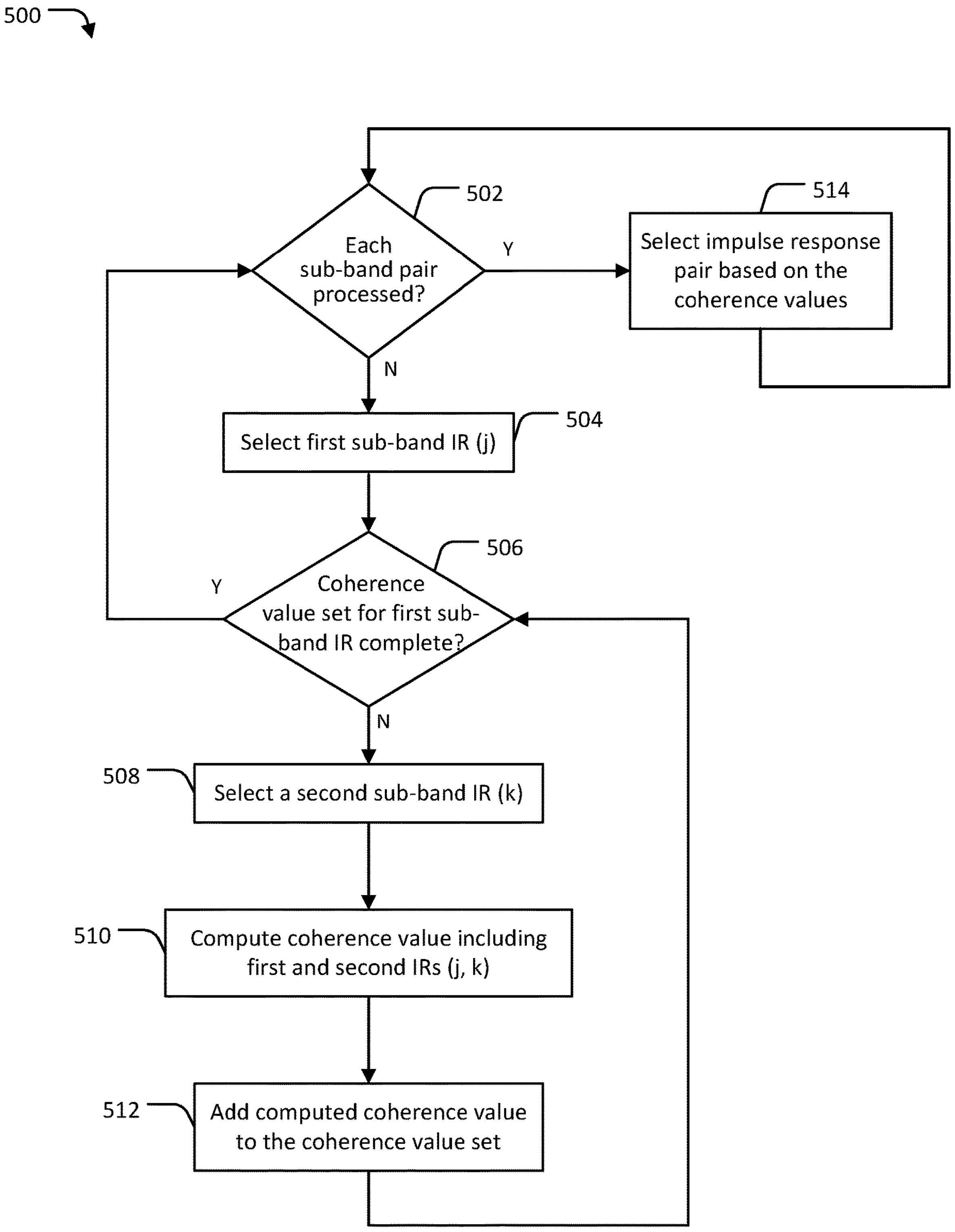
FIG. 5 sets forth a flow chart of method steps for selecting a pair of sub-band impulse responses for use in an interpolation from a sub-band impulse response grouping, according to various embodiments.

FIG. 5 sets forth a flow chart of method steps for selecting a pair of sub-band impulse responses for use in an interpolation from a sub-band impulse response grouping 320, according to one or more embodiments. Although the method steps are described with reference to the embodiments of FIGS. 1-3, persons skilled in the art will understand that any system configured to implement the method steps, in any order, falls within the scope of the present disclosure.

Method 500 begins at step 502, the audio processing application 120 determines whether each pair of sub-band impulse responses in a sub-band grouping 320 has been processed. In various embodiments, the impulse response coherence calculator 122 included in the audio processing application 120 determines whether the coherence value set 330 for the sub-band grouping 320 currently stores Z coherence values 332(1)-332(Z), where Z is equivalent to $$\binom{N}{2}$$

combinations or IN sub-Dana impulse responses included in the sub-band grouping 320. When the impulse response coherence calculator 122 determines that each sub-band pair has been processed, the impulse response coherence calculator 122 proceeds to step 514. Otherwise, the impulse response coherence calculator 122 determines that at least one sub-band pair requires processing and proceeds to step 506.

At step 504, the audio processing application 120 selects a first sub-band impulse response (IR) from the sub-band grouping 320. In various embodiments, the impulse response coherence calculator 122 iteratively generates each coherence value 332 by selecting a first sub-band impulse response (j) of a sub-band impulse response pair from the sub-band grouping 320.

At step 506, the audio processing application 120 determines whether the coherence value set 330 for the first sub-band impulse response is complete. In various embodiments, the impulse response coherence calculator 122 determines whether the coherence value set 330 includes a coherence value 332 for each paired combination that includes the first sub-band impulse response. When the impulse response coherence calculator 122 determines that the coherence value set 330 includes each of the requisite coherence values 332 for the first sub-band impulse response, the impulse response coherence calculator 122 returns to step 504 to determine whether the select a different first sub-band impulse response. Otherwise, the impulse response coherence calculator 122 determines that the coherence value set 330 requires at least one coherence value 332 including the first sub-band impulse response and proceeds to step 510.

At step 508, the audio processing application 120 selects a second sub-band impulse response from the sub-band grouping. In various embodiments, the impulse response coherence calculator 122 selects at second sub-band impulse response (k) to form a paired combination with the first sub-band impulse response. When selecting the second sub-band impulse response, the impulse response coherence calculator 122 identifies, from the sub-band grouping 320, a subgroup of sub-band impulse responses for which the impulse response coherence calculator 122 has not yet computed a coherence value 332 as part of a paired combination with the first sub-band impulse response. The impulse response coherence calculator 122 then selects one sub-band impulse response from the subgroup as the second sub-band impulse response.

At step 510, the audio processing application 120 computes a coherence value for the paired combination that includes the first sub-band impulse response and the second sub-band impulse response. In various embodiments, the impulse response coherence calculator 122 computes a coherence value 332 for the paired combination (j, k) of sub-band impulse responses based on the spectral density of the impulse responses. In some embodiments, the impulse response coherence calculator 122 performs actions similar to step 412 of method 400 by calculating a coherence value 332, such as a coherence signal, for the paired combination of the first and second sub-band impulse responses. In some embodiments, the impulse response coherence calculator 122 can determine a single coherence value from the coherence signal (e.g., averaging the coherence signal). Alternatively, in some embodiments, the impulse response coherence calculator 122 generates a single coherence value for the paired combination.

At step 512, the audio processing application 120 adds the computed coherence value for the paired combination to the coherence value set 330. In various embodiments, upon calculating the coherence value 332, the impulse response coherence calculator 122 adds the coherence value 332 for the paired combination (j, k) into the coherence value set 330. Upon adding the coherence value 332 to the coherence value set 330, the impulse response coherence calculator 122 returns to the step 508 to determine whether the coherence value set 330 for the first sub-band impulse response is complete.

At step 514, the audio processing application 120 selects an impulse response pair based on the coherence values in the coherence value set. In various embodiments, upon determining that the coherence value set 330 for the sub-band grouping 320 is complete, the interpolator 124, based on the coherence values 332 included in the coherence value set 330, selects an impulse response pair 336. In some embodiments, the impulse response coherence calculator 122 performs actions similar to step 412 of method 400 by comparing the coherence values 332(1)-332(Z) included in the coherence value set 330 and determining a coherence value that meets a set of one or more criteria and identifies the impulse response pair corresponding to the coherence value. For example, when each coherence value is a single value, the interpolator 124 determines the maximum coherence value, identifies the impulse response pair corresponding to the maximum coherence value, and sets the selected coherence value 334 equal to the maximum coherence value. In some embodiments, the coherence values 332 varies over the frequency range of the sub-band. In such instances, the interpolator 124 selects the impulse response pair 336 associated with the coherence signal possessing the maximum average value. Alternatively, the interpolator 124 selects the impulse response pair 336 using different criteria. For example, the interpolator 124 can select the impulse response pair 336 associated with a coherence value that corresponds to the median, mean, or minimum value in the coherence value set 330.

In sum, an audio processing application sets the parameters for one or more filters that are used by a speaker to generate a sound field when reproducing an audio signal. The audio processing application generates the parameters for the one or more filters based on estimated impulse responses at a target location in a listening environment, such as where a listener is located. The audio processing application estimates the impulse response for a target location by acquiring stored impulse response data, such measured impulse responses at multiple locations within the listening environment. The audio processing system selects a subset of the stored impulse responses surrounding the target location based on one or more characteristics, such as Euclidean or perceived acoustic distance of the locations corresponding to the impulse responses relative to the target location. For each of the selected impulse responses, the audio processing application filters the impulse response into separate sub-band frequency impulse responses, each representing a separate frequency range. The audio processing application groups the selected impulse responses by sub-band, where a given sub-band grouping contains multiple impulse responses of a common sub-band.

For each sub-band grouping, the audio processing system selects a pair of impulse responses that are most similar (e.g., have a highest coherence value) to each other. If the impulse responses in the selected pair are sufficiently similar, a linear interpolation technique is used to combine the impulse responses in the selected pair. If the impulse responses in the selected pair are not sufficiently similar, a non-linear interpolation technique is used to combine the impulse responses in the selected pair. The combined impulse responses are then used to set the parameters of the one or more filters. The one or more filters are then used to process audio to be emitted by the speaker in order to generate a desired sound filed at the target location.

At least one technical advantage of the disclose techniques relative to the prior art is that, with the disclosed techniques, an audio processing system can more accurately generate a sound field for a particular location in an environment, which increases the auditory experience of a user at the particular location. Further, the disclosed techniques are able to generate impulse response filters more accurately for the particular location from a smaller set of impulse response filters than prior art techniques. The disclosed techniques therefore reduce the memory used by the audio processing system when estimating impulse responses at particular locations. Further, the disclosed techniques reduce the time needed to collect measurements of impulse responses at locations within a listening environment needed to generate an accurate sound field. These technical advantages provide one or more technological advancements over prior art approaches.

1. A computer-implemented method comprising determining a target location in an environment, determining a set of sub-band impulse responses for a first frequency sub-band, each sub-band impulse response in the set of sub-band impulse responses being associated with a corresponding location that is proximate to the target location, selecting a first pair of sub-band impulse responses for the first frequency sub-band from among pairs of sub-band impulse responses in the set of sub-band impulse responses, computing a first coherence value indicating a level of coherence between sub-band impulse responses in the first pair, determining that the first coherence value is below a coherence threshold, in response to determining that the first coherence value is below the coherence threshold, combining the sub-band impulse responses in the first pair using a non-linear interpolation technique to generate an estimated impulse response for the first frequency sub-band for the target location, generating, based at least on the estimated impulse response, a filter for a speaker, filtering, by the filter, an audio signal to generate a filtered audio signal, and causing the speaker to output the filtered audio signal.

2. The computer-implemented method of clause 1, where the corresponding location of each of the sub-band impulse responses in the set of sub-band impulse responses is within a threshold distance of the target location, and where the threshold distance is one of a Euclidean distance or a perceived audio distance.

3. The computer-implemented method of clause 1 or 2, where selecting the first pair of sub-band impulse responses comprises computing, for each pair of impulse responses in the set of sub-band impulse responses, a corresponding coherence value between the impulse responses in the pair, and selecting, as the first pair, the pair of impulse responses having a highest coherence value.

4. The computer-implemented method of any of clauses 1-3, where the non-linear interpolation technique is one selected from a group of nearest-neighbor interpolation copying a single measured impulse response, a Lagrange interpolation, a least-squares interpolation, a bicubic spline interpolation, a cosine interpolation, or a parabolic interpolation.

5. The computer-implemented method of any of clauses 1-4, further comprising determining, a second set of sub-band impulse responses for a second frequency sub-band, each sub-band impulse response in the second set of sub-band impulse responses corresponding to a sub-band impulse response in the second set of sub-band impulse responses, selecting a second pair of sub-band impulse responses for the second frequency sub-band from among pairs of sub-band impulse responses in the second set of sub-band impulse responses, computing a second coherence value indicating a level of coherence between sub-band impulse responses in the second pair, and determining whether the second coherence value is equal to or above the coherence threshold.

6. The computer-implemented method of any of clauses 1-5, further comprising in response to determining that the second coherence value is equal to or above the coherence threshold, combining the sub-band impulse responses in the second pair using a linear interpolation technique to generate a second estimated impulse response for the second frequency sub-band for the target location, or in response to determining that the second coherence value is below the coherence threshold, combining the sub-band impulse responses in the second pair using the non-linear interpolation technique to generate the second estimated impulse response for the second frequency sub-band for the target location, where the filter is further based on the second estimated impulse response.

7. The computer-implemented method of any of clauses 1-6, where determining the set of sub-band impulse responses comprises decomposing each impulse response in a set of impulse responses into a plurality of sub-band impulse responses, where each sub-band impulse response in the plurality of sub-band impulse responses is associated with a different frequency range, and grouping, from each impulse response in the set of impulse responses, the sub-band impulse response for the first frequency sub-band to generate the set of sub-band impulse responses for the first frequency sub-band.

8. The computer-implemented method of any of clauses 1-7, where the target location is based on a location of a listener within the environment.

9. The computer-implemented method of any of clauses 1-8, further comprising determining a second target location in the environment, where the second target location corresponds to a second listener within the environment, determining a second set of sub-band impulse responses for the first frequency sub-band, each sub-band impulse response in the second set of sub-band impulse responses being associated with a corresponding location that is proximate to the second target location, generating, based on the second set of impulse responses, a second estimated impulse response for the second target location, and generating, based at least on the second estimated impulse response, a second filter for the speaker.

10. The computer-implemented method of any of clauses 1-9, further comprising determining an updated target location in the environment, determining a second set of sub-band impulse responses for the first frequency sub-band, each sub-band impulse response in the second set of sub-band impulse responses being associated with a corresponding location that is proximate to the updated target location, generating an updated estimated impulse response based on the second set of impulse responses, and updating, based on the updated estimated impulse response, the filter for the speaker.

11. In various embodiments, one or more non-transitory computer-readable media comprise instructions that, when executed by one or more processors, cause the one or more processors to perform the steps of determining a target location in an environment, determining a set of sub-band impulse responses for a first frequency sub-band, each sub-band impulse response in the set of sub-band impulse responses being associated with a corresponding location that is proximate to the target location, selecting a first pair of sub-band impulse responses for the first frequency sub-band from among pairs of sub-band impulse responses in the set of sub-band impulse responses, computing a first coherence value indicating a level of coherence between sub-band impulse responses in the first pair, determining that the first coherence value is below a coherence threshold, in response to determining that the first coherence value is below the coherence threshold, combining the sub-band impulse responses in the first pair using a non-linear interpolation technique to generate an estimated impulse response for the first frequency sub-band for the target location, generating, based at least on the estimated impulse response, a filter for a speaker, filtering, by the filter, an audio signal to generate a filtered audio signal, and causing the speaker to output the filtered audio signal.

12. The one or more non-transitory computer-readable media of clause 11, where the corresponding location of each of the sub-band impulse responses in the set of sub-band impulse responses is within a threshold distance of the target location, and where the threshold distance is one of a Euclidean distance or a perceived audio distance.

13. The one or more non-transitory computer-readable media of clause 11 or 12, where the corresponding location of each of the sub-band impulse responses in the set of sub-band impulse responses is located a corresponding distance from the target location, the corresponding distance is one of a Euclidean distance or a perceived audio distance, and determining the set of sub-band impulse responses comprises selecting a predetermined number of the sub-band impulse responses whose corresponding distances are shortest.

14. The one or more non-transitory computer-readable media of any of clauses 11-13, where selecting the first pair of sub-band impulse responses comprises computing, for each pair of impulse responses in the set of sub-band impulse responses, a corresponding coherence value between the impulse responses in the pair, and selecting, as the first pair, the pair of impulse responses having a highest coherence value.

15. The one or more non-transitory computer-readable media of any of clauses 11-14, the steps further comprising determining, a second set of sub-band impulse responses for a second frequency sub-band, each sub-band impulse response in the second set of sub-band impulse responses corresponding to a sub-band impulse response in the second set of sub-band impulse responses, selecting a second pair of sub-band impulse responses for the second frequency sub-band from among pairs of sub-band impulse responses in the second set of sub-band impulse responses, computing a second coherence value indicating a level of coherence between sub-band impulse responses in the second pair, determining whether the second coherence value is equal to or above the coherence threshold, and in response to determining that the second coherence value is equal to or above the coherence threshold, combining the sub-band impulse responses in the second pair using a linear interpolation technique to generate a second estimated impulse response for the second frequency sub-band for the target location, or in response to determining that the second coherence value is below the coherence threshold, combining the sub-band impulse responses in the second pair using the non-linear interpolation technique to generate the second estimated impulse response for the second frequency sub-band for the target location, where the filter is further based on the second estimated impulse response.

16. The one or more non-transitory computer-readable media of any of clauses 11-15, where the target location is based on a location of a listener within the environment.

17. In various embodiments, a system comprises a memory storing instructions, and a processor coupled to the memory that executes the instructions to perform steps comprising determining a target location in an environment, determining a set of sub-band impulse responses for a first frequency sub-band, each sub-band impulse response in the set of sub-band impulse responses being associated with a corresponding location that is proximate to the target location, selecting a first pair of sub-band impulse responses for the first frequency sub-band from among pairs of sub-band impulse responses in the set of sub-band impulse responses, computing a first coherence value indicating a level of coherence between sub-band impulse responses in the first pair, determining that the first coherence value is below a coherence threshold, in response to determining that the first coherence value is below the coherence threshold, combining the sub-band impulse responses in the first pair using a non-linear interpolation technique to generate an estimated impulse response for the first frequency sub-band for the target location, generating, based at least on the estimated impulse response, a filter for a speaker, filtering, by the filter, an audio signal to generate a filtered audio signal, and causing the speaker to output the filtered audio signal.

18. The system of clause 17, where selecting the first pair of sub-band impulse responses comprises computing, for each pair of impulse responses in the set of sub-band impulse responses, a corresponding coherence value between the impulse responses in the pair, and selecting, as the first pair, the pair of impulse responses having a highest coherence value.

19. The system of clauses 17 or 18, further comprising a sensor, where the steps further comprise acquiring, using the sensor, sensor data associated within a listener within the environment, and determining the target location based on the sensor data.

20. The system of any of clauses 17-19, where the filter comprises a filter bank including distinct filters for separate frequency bands.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RANI), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:

determining a target location in an environment;

determining a set of sub-band impulse responses for a first frequency sub-band, each sub-band impulse response in the set of sub-band impulse responses being associated with a corresponding location that is proximate to the target location;

selecting a first pair of sub-band impulse responses for the first frequency sub-band from among pairs of sub-band impulse responses in the set of sub-band impulse responses;

computing a first coherence value indicating a level of coherence between sub-band impulse responses in the first pair;

determining that the first coherence value is below a coherence threshold;

in response to determining that the first coherence value is below the coherence threshold, combining the sub-band impulse responses in the first pair using a non-linear interpolation technique to generate an estimated impulse response for the first frequency sub-band for the target location;

generating, based at least on the estimated impulse response, a filter for a speaker;

filtering, by the filter, an audio signal to generate a filtered audio signal; and causing the speaker to output the filtered audio signal.

2. The computer-implemented method of claim 1, wherein the corresponding location of each of the sub-band impulse responses in the set of sub-band impulse responses is within a threshold distance of the target location, and wherein the threshold distance is one of a Euclidean distance or a perceived audio distance.

3. The computer-implemented method of claim 1, wherein selecting the first pair of sub-band impulse responses comprises:

computing, for each pair of impulse responses in the set of sub-band impulse responses, a corresponding coherence value between the impulse responses in the pair; and selecting, as the first pair, the pair of impulse responses having a highest coherence value.

4. The computer-implemented method of claim 1, wherein the non-linear interpolation technique is selected from a group consisting of: nearest-neighbor interpolation, a Lagrange interpolation, a least-squares interpolation, a bicubic spline interpolation, a cosine interpolation, and a parabolic interpolation.

5. The computer-implemented method of claim 1, further comprising:

determining, a second set of sub-band impulse responses for a second frequency sub-band, each sub-band impulse response in the second set of sub-band impulse responses corresponding to a sub-band impulse response in the second set of sub-band impulse responses;

selecting a second pair of sub-band impulse responses for the second frequency sub-band from among pairs of sub-band impulse responses in the second set of sub-band impulse responses;

computing a second coherence value indicating a level of coherence between sub-band impulse responses in the second pair; and determining whether the second coherence value is equal to or above the coherence threshold.

6. The computer-implemented method of claim 5, further comprising:

in response to determining that the second coherence value is equal to or above the coherence threshold, combining the sub-band impulse responses in the second pair using a linear interpolation technique to generate a second estimated impulse response for the second frequency sub-band for the target location; or in response to determining that the second coherence value is below the coherence threshold, combining the sub-band impulse responses in the second pair using the non-linear interpolation technique to generate the second estimated impulse response for the second frequency sub-band for the target location, wherein the filter is further based on the second estimated impulse response.

7. The computer-implemented method of claim 1, wherein determining the set of sub-band impulse responses comprises:

decomposing each impulse response in a set of impulse responses into a plurality of sub-band impulse responses, wherein each sub-band impulse response in the plurality of sub-band impulse responses is associated with a different frequency range; and grouping, from each impulse response in the set of impulse responses, the sub-band impulse response for the first frequency sub-band to generate the set of sub-band impulse responses for the first frequency sub-band.

8. The computer-implemented method of claim 1, wherein the target location is based on a location of a listener within the environment.

9. The computer-implemented method of claim 8, further comprising:

determining a second target location in the environment, wherein the second target location corresponds to a second listener within the environment;

determining a second set of sub-band impulse responses for the first frequency sub-band, each sub-band impulse response in the second set of sub-band impulse responses being associated with a corresponding location that is proximate to the second target location;

generating, based on the second set of impulse responses, a second estimated impulse response for the second target location; and generating, based at least on the second estimated impulse response, a second filter for the speaker.

10. The computer-implemented method of claim 1, further comprising:

determining an updated target location in the environment;

determining a second set of sub-band impulse responses for the first frequency sub-band, each sub-band impulse response in the second set of sub-band impulse responses being associated with a corresponding location that is proximate to the updated target location;

generating an updated estimated impulse response based on the second set of impulse responses; and updating, based on the updated estimated impulse response, the filter for the speaker.

11. One or more non-transitory computer-readable media comprising instructions that, when executed by one or more processors, cause the one or more processors to perform the steps of:

determining a target location in an environment;

determining a set of sub-band impulse responses for a first frequency sub-band, each sub-band impulse response in the set of sub-band impulse responses being associated with a corresponding location that is proximate to the target location;

selecting a first pair of sub-band impulse responses for the first frequency sub-band from among pairs of sub-band impulse responses in the set of sub-band impulse responses;

computing a first coherence value indicating a level of coherence between sub-band impulse responses in the first pair;

determining that the first coherence value is below a coherence threshold;

in response to determining that the first coherence value is below the coherence threshold, combining the sub-band impulse responses in the first pair using a non-linear interpolation technique to generate an estimated impulse response for the first frequency sub-band for the target location;

generating, based at least on the estimated impulse response, a filter for a speaker;

filtering, by the filter, an audio signal to generate a filtered audio signal; and causing the speaker to output the filtered audio signal.

12. The one or more non-transitory computer-readable media of claim 11, wherein the corresponding location of each of the sub-band impulse responses in the set of sub-band impulse responses is within a threshold distance of the target location, and wherein the threshold distance is one of a Euclidean distance or a perceived audio distance.

13. The one or more non-transitory computer-readable media of claim 11, wherein:

the corresponding location of each of the sub-band impulse responses in the set of sub-band impulse responses is located a corresponding distance from the target location, the corresponding distance is one of a Euclidean distance or a perceived audio distance; and determining the set of sub-band impulse responses comprises selecting a predetermined number of the sub-band impulse responses whose corresponding distances are shortest.

14. The one or more non-transitory computer-readable media of claim 11, wherein selecting the first pair of sub-band impulse responses comprises:

computing, for each pair of impulse responses in the set of sub-band impulse responses, a corresponding coherence value between the impulse responses in the pair; and selecting, as the first pair, the pair of impulse responses having a highest coherence value.

15. The one or more non-transitory computer-readable media of claim 11, the steps further comprising:

determining, a second set of sub-band impulse responses for a second frequency sub-band, each sub-band impulse response in the second set of sub-band impulse responses corresponding to a sub-band impulse response in the second set of sub-band impulse responses;

selecting a second pair of sub-band impulse responses for the second frequency sub-band from among pairs of sub-band impulse responses in the second set of sub-band impulse responses;

computing a second coherence value indicating a level of coherence between sub-band impulse responses in the second pair;

determining whether the second coherence value is equal to or above the coherence threshold; and in response to determining that the second coherence value is equal to or above the coherence threshold, combining the sub-band impulse responses in the second pair using a linear interpolation technique to generate a second estimated impulse response for the second frequency sub-band for the target location; or in response to determining that the second coherence value is below the coherence threshold, combining the sub-band impulse responses in the second pair using the non-linear interpolation technique to generate the second estimated impulse response for the second frequency sub-band for the target location, wherein the filter is further based on the second estimated impulse response.

16. The one or more non-transitory computer-readable media of claim 11, wherein the target location is based on a location of a listener within the environment.

17. A system comprising:

a memory storing instructions; and a processor coupled to the memory that executes the instructions to perform steps comprising:

determining a target location in an environment;

determining a set of sub-band impulse responses for a first frequency sub-band, each sub-band impulse response in the set of sub-band impulse responses being associated with a corresponding location that is proximate to the target location;

selecting a first pair of sub-band impulse responses for the first frequency sub-band from among pairs of sub-band impulse responses in the set of sub-band impulse responses;

computing a first coherence value indicating a level of coherence between sub-band impulse responses in the first pair;

determining that the first coherence value is below a coherence threshold;

in response to determining that the first coherence value is below the coherence threshold, combining the sub-band impulse responses in the first pair using a non-linear interpolation technique to generate an estimated impulse response for the first frequency sub-band for the target location;

generating, based at least on the estimated impulse response, a filter for a speaker;

filtering, by the filter, an audio signal to generate a filtered audio signal; and causing the speaker to output the filtered audio signal.

18. The system of claim 17, wherein selecting the first pair of sub-band impulse responses comprises:

computing, for each pair of impulse responses in the set of sub-band impulse responses, a corresponding coherence value between the impulse responses in the pair; and selecting, as the first pair, the pair of impulse responses having a highest coherence value.

19. The system of claim 17, further comprising a sensor;

wherein the steps further comprise:

acquiring, using the sensor, sensor data associated within a listener within the environment; and determining the target location based on the sensor data.

20. The system of claim 17, wherein the filter comprises a filter bank including distinct filters for separate frequency bands.

* * * * *